United States Patent
Bhakta et al.

(10) Patent No.: US 8,166,111 B2
(45) Date of Patent: Apr. 24, 2012

(54) METHOD FOR CORRECTING A RECEIVED ELECTRONIC MAIL HAVING AN ERRONEOUS HEADER

(75) Inventors: Dharmesh N. Bhakta, Austin, TX (US); Trung Q. Ly, Austin, TX (US); Juan Francisco Obas, Austin, TX (US); Lakshmi N. Potluri, Austin, TX (US); Guillermo Jesus Silva, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1382 days.

(21) Appl. No.: 11/269,264

(22) Filed: Nov. 8, 2005

(65) Prior Publication Data

US 2007/0106731 A1 May 10, 2007

(51) Int. Cl.
G06F 15/16 (2006.01)
G06F 3/00 (2006.01)
(52) U.S. Cl. ......... 709/206; 709/204; 709/217; 715/752
(58) Field of Classification Search .................... 709/206
See application file for complete search history.

(56) References Cited

U.S. PATENT DOCUMENTS

| | | | |
|---|---|---|---|
| 5,870,548 A * | 2/1999 | Nielsen ..................... | 709/206 |
| 6,065,026 A | 5/2000 | Cornelia et al. | |
| 7,222,156 B2 | 5/2007 | Gupta et al. | |
| 7,320,019 B2 | 1/2008 | Malik | |
| 7,353,466 B2 | 4/2008 | Crane et al. | |
| 2002/0023138 A1* | 2/2002 | Quine et al. ............... | 709/206 |
| 2002/0049793 A1* | 4/2002 | Okumura et al. .......... | 707/526 |
| 2002/0065891 A1 | 5/2002 | Malik | |
| 2002/0099777 A1* | 7/2002 | Gupta et al. ............... | 709/206 |
| 2002/0194278 A1* | 12/2002 | Golan ....................... | 709/206 |
| 2003/0037114 A1* | 2/2003 | Nishio et al. .............. | 709/206 |
| 2003/0212749 A1 | 11/2003 | Jenkins et al. | |
| 2004/0083230 A1* | 4/2004 | Caughey .................... | 707/104.1 |
| 2004/0181586 A1* | 9/2004 | Morreale et al. .......... | 709/206 |
| 2005/0268237 A1 | 12/2005 | Crane et al. | |
| 2007/0106730 A1 | 5/2007 | Bhakta et al. | |

OTHER PUBLICATIONS

"G-Lock Software" http://www.hot-shareware.com/internet-tools/glock-email-processor/index.html, retrieved Oct. 3, 2005, pp. 1-2.
"G-Lock Email Processor" http://www.glocksoft.com/amlv/index.htm, retrieved Oct. 3, 2005, pp. 1-3.
"BounceMailmanager 1.0—Identify and Retrieve undeliverable bounce . . . ", 2003-2004, http://www.soft411.com/company/Mailsbroadcast-dotcom/BounceMailmanager.htm, retrieved Oct. 3, 2005, pp. 1-2.
Postel, "Simple Mail Transfer Protocol", RFC 821, Aug. 1982, Marina del Rey, CA, pp. 1-46.

(Continued)

*Primary Examiner* — Jeffrey Pwu
*Assistant Examiner* — Jasmine Myers
(74) *Attorney, Agent, or Firm* — Yee & Associates, P.C.; David A. Mims, Jr.

(57) ABSTRACT

A computer implemented method, system, and computer usable program code for correcting a received electronic mail having an erroneous header. Responsive to a recipient receiving an e-mail indicating the erroneous header, the recipient corrects the erroneous header to form a corrected header. Responsive to the recipient correcting the erroneous header to form the corrected header, a received e-mail is updated for other recipients and a sender of the received e-mail with the corrected header.

20 Claims, 8 Drawing Sheets

OTHER PUBLICATIONS

Crocker, "Standard for the format of ARPA Internet text messages", RFC 822, Aug. 1982, Newark DE, pp. 1-42.
Resnick, "Internet Message Format", RFC 2822, The Internet Society, Apr. 2001, pp. 1-40.
USPTO Office action dated Oct. 15, 2009 for U.S. Appl. No. 11/269,193.
USPTO office action for U.S. Appl. No. 11/269,193, dated Jun. 25, 2010.

* cited by examiner 502                              500
Return-Path: <oprah@ibm.com>

Received: from smtp-scan.aspware.net ([66.180.40.3] verified)

by aspware.net (CommuniGate Pro SMTP 4.2.8)          504 with ESMTP id 23867961 for bob@abc.net; Tue, 4 Oct 2005 10:13:31 -0500

X-SpamCather-Score: 2-[X]

Received: from smtp104.sbc.mail.mud.yahoo.com ([68.142.198.203] verified)

by smtp-scan.aspware.net (CommuniGate Pro SMTP 4.2.8)

with SMTP id 18265978 for bob@abc.net; Tue, 4 Oct 2005 10:13:30 -0500

Received: (qmail 27707 invoked from network); 4 Oct 2005 15:04:40 -0000

Received: from unknown (HELO OprahD610) (oprah@ibm.com @66.180.63.146 with login)

by smtp104.sbc.mail.mud.yahoo.com with SMTP; 4 Oct 2005 15:04:40 -0000

Message-ID: <006d01c5ce6d$646d29c0$d9a33109@ibm.com>

From: "Oprah" <oprah@ibm.com>   510

To: "bob" <bob@abc.net>,

"sam" <sam@ibm.com>,            506

"johnny" johnny@1n.abc.net

512

Subject: Today's lunch meeting

508

Date: Tue, 4 Oct 2005 10:13:31 -0500

MIME-Version: 1.0

Content-Type: multipart/alternative;

boundary="----=_NextPart_000_006A_01C5CE43.7B13E800"

X-Priority: 3

X-MSMail-Priority: Normal

X-Mailer: Microsoft Outlook Express 6.00.2900.2180

X-MimeOLE: Produced by Microsoft MimeOLE V6.00.2900.2180

*FIG. 5*

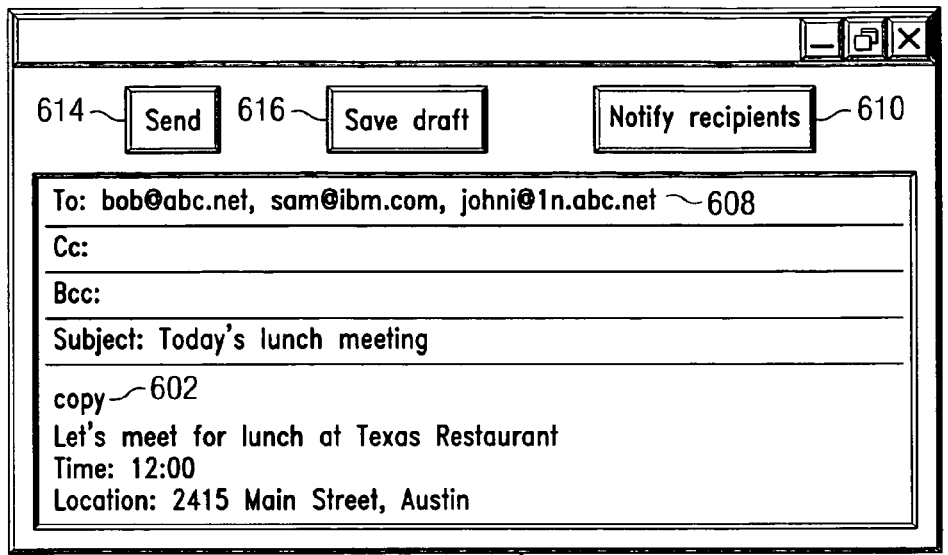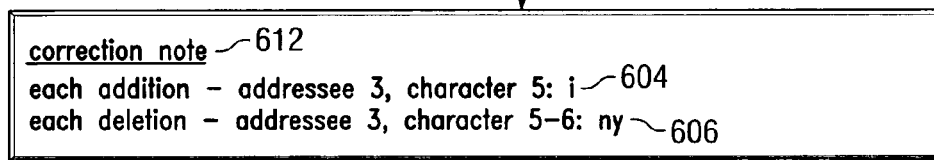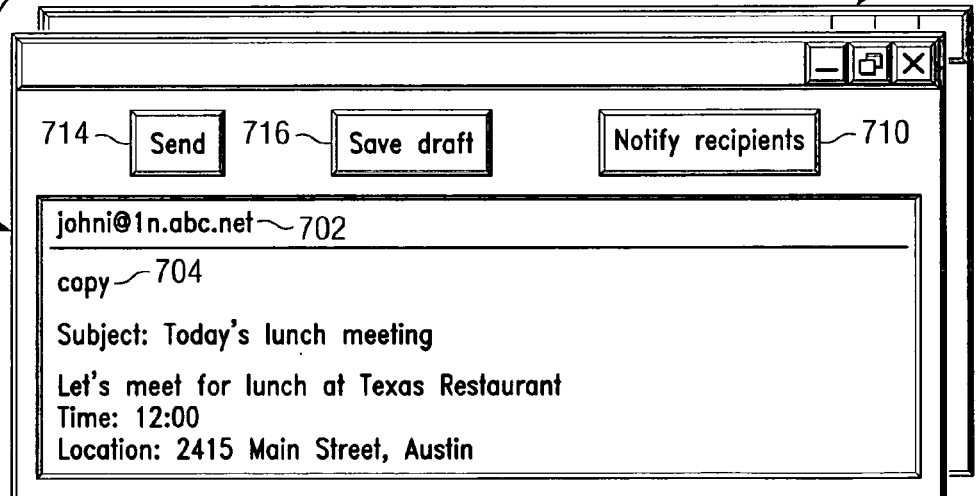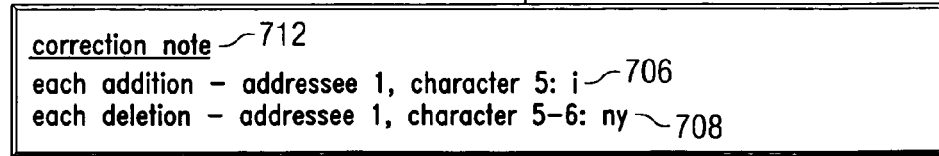

METHOD FOR CORRECTING A RECEIVED ELECTRONIC MAIL HAVING AN ERRONEOUS HEADER

BACKGROUND OF THE INVENTION

1. Field of the Invention

The present invention relates generally to an improved data processing system and in particular to a computer implemented method, system, and computer usable program code for optimizing performance in a data processing system. Still more particularly, the present invention provides a computer implemented method, system, and computer usable program code for correcting a received e-mail having an erroneous header.

2. Description of the Related Art

As the Internet has matured, so has electronic mail which is also referred to as e-mail. However, humans make errors even with features such as e-mail address books and other tools provided, by e-mail user client software, known as e-mail clients. One example of a human error that may occur is when an e-mail user acts as an e-mail sender by sending out an e-mail to a group of e-mail recipients and enters an erroneous address for an intended e-mail recipient. An e-mail address for each intended recipient is included in a header for an e-mail. An erroneous header may be erroneous because it contains an e-mail address that the e-mail sender accidentally entered erroneously, or the erroneous header may be erroneous because it contains any e-mail address that an e-mail sender believes to be correct but which is actually erroneous.

If the e-mail sender entered an erroneous e-mail address in an e-mail sent to only one intended e-mail recipient, the solution is simple. A mail server is a computer program or software agent that transfers electronic mail from one computer to another computer and such a mail server may be unable to deliver the original e-mail to the intended recipient that is erroneously addressed. An intended recipient that is erroneously addressed is any intended e-mail recipient whose e-mail address is erroneous in the header. When an attempted delivery of the original e-mail fails, a mail server sends a delivery failure e-mail that contains the erroneous header with the failed e-mail address to the e-mail client for the e-mail sender. The delivery failure e-mail informs the e-mail client for the e-mail sender of the delivery failure for the original e-mail. After being informed of the delivery failure of the original e-mail to the erroneous e-mail address, the e-mail sender may correct the erroneous e-mail address in the erroneous header that the mail server returned in the delivery failure e-mail and send a copy of the original e-mail using the corrected e-mail address.

However, when an e-mail sender sends out an e-mail to a group of e-mail recipients and enters an erroneous address of an intended e-mail recipient, additional problems may arise. One such problem is illustrated by the following example. An e-mail sender, Oprah, plans to send an e-mail to the following intended e-mail recipients: Bob, Sam, and John, whose e-mail addresses are bob@abc.net, sam@ibm.com, and johni@ln.abc.net, respectively. However, Oprah enters the e-mail address of John as johnny@ln.abc.net. A mail server sends a delivery failure e-mail that contains the erroneous header with the failed e-mail address for John to the e-mail client for Oprah. The delivery failure e-mail informs the e-mail client for Oprah of the delivery failure for the original e-mail that Oprah attempted to send to John. Because Oprah correctly entered the e-mail addresses for Bob and Sam, the e-mail clients for Bob and Sam received the e-mail that Oprah sent. A received e-mail is an e-mail that a mail server has transferred to the e-mail client for the e-mail recipient. A recipient of a received e-mail is anyone whose e-mail client received the received e-mail. At this point, Oprah has sent the original e-mail to Bob and Sam but not to John.

Oprah then corrects the erroneous e-mail address for John in order to send a copy of the original e-mail. Oprah has a first option of sending a copy of the e-mail with the corrected e-mail address for John to all of the original intended recipients, Bob, Sam, and John. Oprah also has a second option of sending a copy of the e-mail with the corrected e-mail address for John to John alone, which is the most often used approach.

The problem with the first option is that both Bob and Sam receive two e-mails with the same content, the original e-mail with the erroneous e-mail address for John, and the second e-mail with the same content and the correct e-mail addresses for all of the original intended recipients. This problem is amplified when the e-mail sender sends the e-mail to a large number of intended e-mail recipients. The problem with the second option occurs if Bob or Sam wish to use a "reply all" feature of the e-mail client to respond to the e-mail. Because under the second option Bob and Sam have only the erroneous e-mail address for John in the received e-mail, Bob and Sam receive a delivery failure e-mail for any attempts to reply to all e-mail addresses listed in the original e-mail and any attempts to reply to all e-mail addresses do not send a reply to John. Additionally, similar problems occur when a recipient changes their e-mail address instead of when an e-mail sender enters an erroneous e-mail address for an intended recipient.

These and similar problems result in greater overhead in terms of data transmission in addition to a tedious correction process.

SUMMARY OF THE INVENTION

Embodiments of the present invention provide a computer implemented method, system, and computer usable program code for correcting a received e-mail having an erroneous header. Responsive to a recipient receiving an e-mail indicating the erroneous header, the recipient corrects the erroneous header to form a corrected header. Responsive to the recipient correcting the erroneous header to form the corrected header, a received e-mail is updated for other recipients and the sender of the received e-mail with the corrected header.

BRIEF DESCRIPTION OF THE DRAWINGS

The novel features believed characteristic of the invention are set forth in the appended claims. The invention in addition to an illustrative mode of use, and further objectives and advantages thereof, will best be understood by reference to the following detailed description of an illustrative embodiment when read in conjunction with the accompanying drawings, wherein:

FIG. 5 is a block diagram illustrating a full view of a header for an e-mail in accordance with an illustrative embodiment of the present invention;

FIG. 6 is a block diagram illustrating a view of an e-mail in a correction e-mail editor for an e-mail client in accordance with an illustrative embodiment of the present invention;

FIG. 7 is a block diagram illustrating a view of an pop-up screen for an e-mail client in accordance with an illustrative embodiment of the present invention;

DETAILED DESCRIPTION OF THE PREFERRED EMBODIMENT

Figure 1:
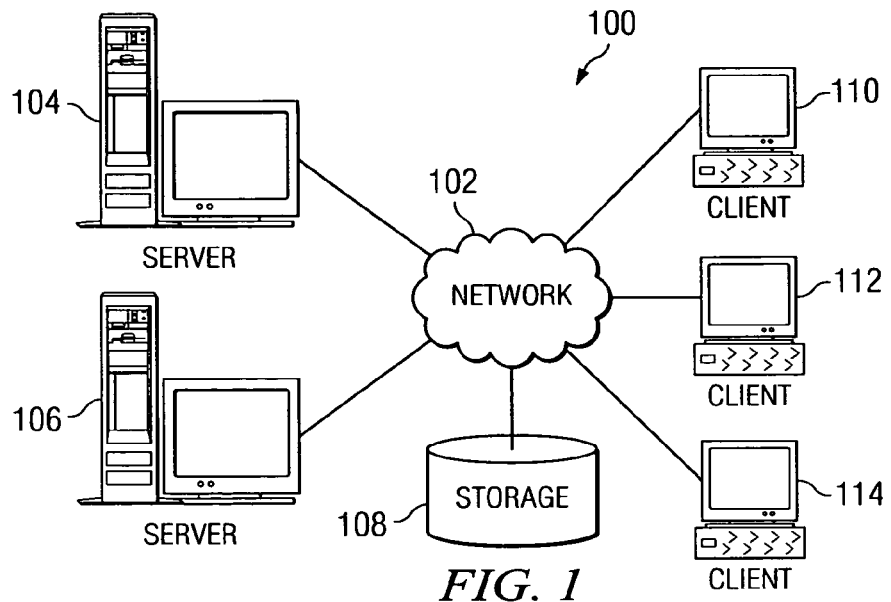
FIG. 1 is a pictorial representation of a data processing system in which the present invention may be implemented in accordance with an illustrative embodiment of the present invention.
Figure 2:
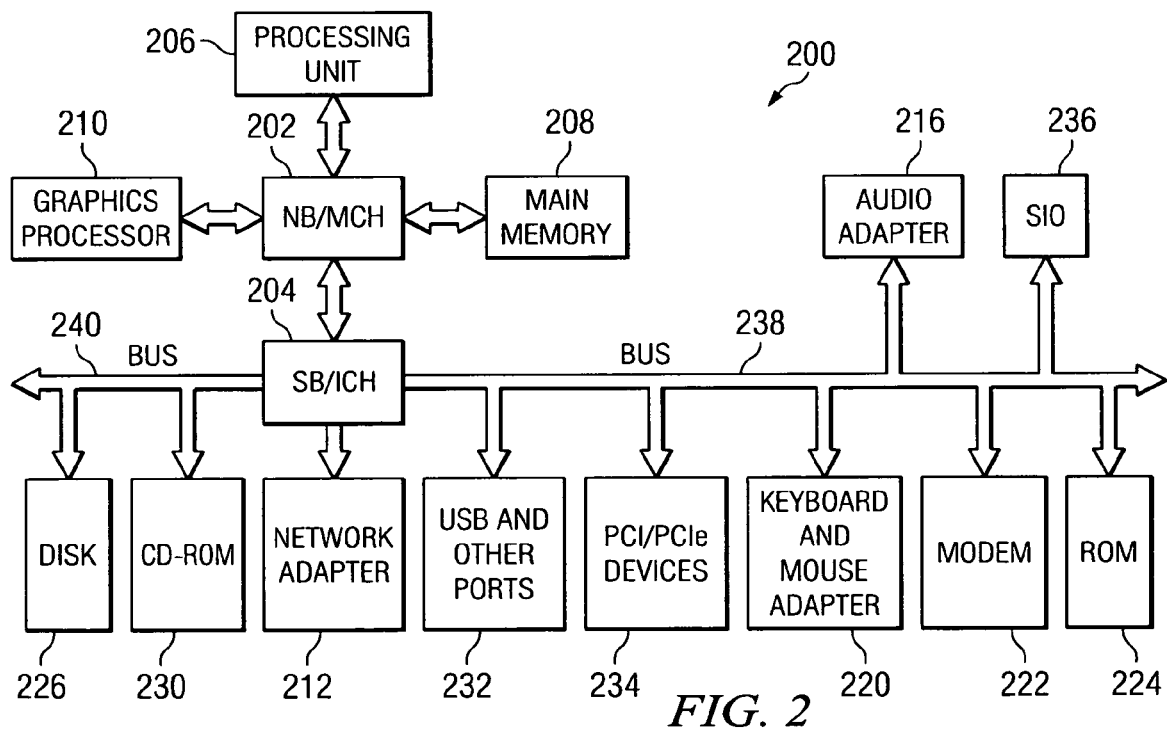
FIG. 2 is a block diagram of a data processing system that may be implemented as a server in which the present invention may be implemented in accordance with an illustrative embodiment of the present invention.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 maybe connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer pSeries® computer system, running the Advanced Interactive Executive (AIX®) operating system or the LINUX® operating system (eserver, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more busses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or LAN 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Embodiments of the present invention may be implemented using components of the network for the data processing system in FIG. 1, such as server 104 or storage 106. These embodiments may be implemented to serve the users of a network such as network 102 for the data processing system in FIG. 1, such as client 110, client 112, or client 114.

Illustrative embodiments of the present invention seamlessly integrate a correction to a received e-mail having an erroneous header. After an e-mail sender has entered an erroneous e-mail address when sending an e-mail, an e-mail user corrects the erroneous header after receiving an e-mail, either a delivery failure e-mail that contains the erroneous header with the failed e-mail address or the original e-mail.

Embodiments of the present invention offer the capability to correct a received e-mail having an erroneous header. Either the e-mail sender or an e-mail recipient may correct the erroneous header in the received e-mail. This correction eliminates the need for an e-mail user to send a copy of the received e-mail to all of the original e-mail recipients.

Instead, illustrative embodiments of the present invention send the mail servers for the recipients of the received e-mail the corrected e-mail address in the corrected header and have the option of prompting the original recipients of the received e-mail to electronically update their e-mail address books with the corrected e-mail address.

Figure 3:
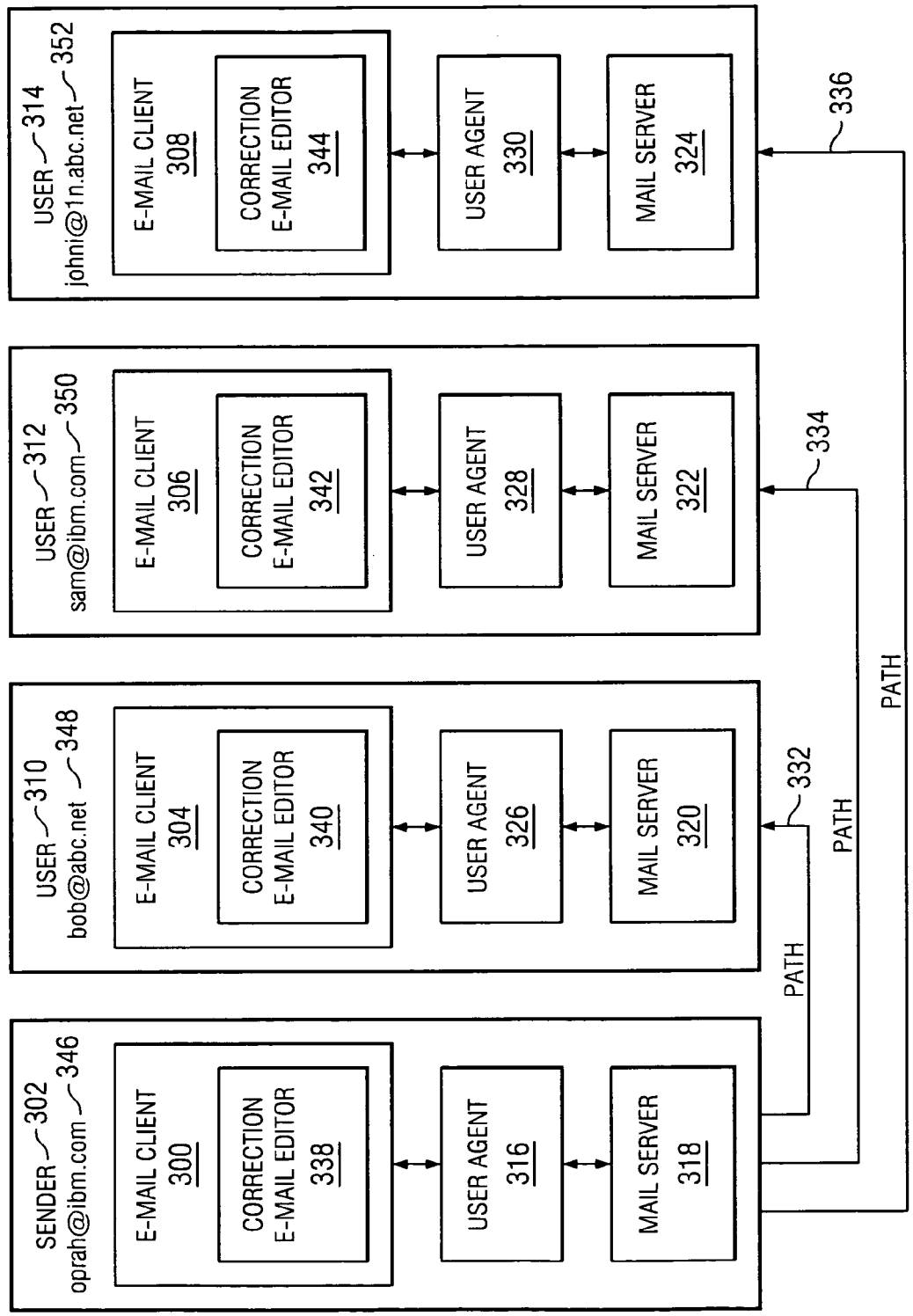
FIG. 3 is a block diagram illustrating a typical interaction between an e-mail sender and mail servers in accordance with an illustrative embodiment of the present invention.

FIG. 3 is block diagram illustrating a typical interaction between an e-mail sender and mail servers depicted in accordance with an illustrative embodiment of the present invention. For example, e-mail client 300 for sender 302, the e-mail sender, may be implemented on a server, such as server 104 in FIG. 1, and the e-mail clients 304, 306, and 308, for recipients, user 310, user 312, and user 314, may be implemented on clients, such as client 110, client 112, and client 114 in FIG. 1. Examples of commercially available e-mail clients include Lotus Notes™, Office Outlook™, and gmail®. Lotus Notes is a trademark of International Business Machines Corporation in the United States, other countries, or both. Office Outlook is a trademark of Microsoft Corporation in the United States, other countries, or both. gmail is a registered trademark of Google Inc. Corporation in the United States, other countries, or both.

In a prior art example, sender 302 composes an e-mail to three different recipients, user 310, user 312, and user 314. Sender 302 composes the e-mail using e-mail client 300 and instructs e-mail client 300 to send the e-mail. E-mail client 300 sends the e-mail to user agent 316, which delivers the e-mail to mail server 318 for sender 302. Essentially, e-mail client 300 activates user agent 316 as an application program interface. Mail server 318 delivers the e-mail to the corresponding mail servers 320, 322, 324. Mail servers 320, 322, 324 use user agents 326, 328, and 330 to deliver the e-mail to the mailboxes in e-mail clients 304, 306, and 308. E-mail clients 304, 306, and 308 are for the recipients, user 310, user 312, and user 314, to whom sender 302 has addressed the e-mail. As the e-mail from sender 302 is routed to the network of mail servers 318, 320, 322, and 324 for its destination, path information is stored in the e-mail header. Path information includes a list of the mail servers in the network of mail servers that conveyed the e-mail from the mail server of the e-mail sender to the mail server of the e-mail recipient. Forward and reverse routing paths 332, 334, and 336 are stored by mail servers 318, 320, 322, and 324 in the e-mail header at each hop. The purpose of the path information, such as information about forward and reverse routing paths 332, 334, and 336, is to help mail server 318 to find the destination for each copy of the e-mail. For example, mail server 318 uses path 336 to deliver an e-mail to mail server 324. Mail server 324 uses path 336 for user 314 to reply to the e-mail from sender 302. In case of a delivery failure, the network of mail servers 318, 320, 322, and 324 use path information stored in the e-mail header to find e-mail client 300 of sender 302 in order to inform e-mail client 300 of the delivery failure. More detailed descriptions of e-mail clients such as e-mail client 300 and mail servers such as mail server 318 may be found at RFC821 (RFC2821) Simple mail transfer protocol, RFC822 Standard for the format of ARPA Internet text messages, and RFC2822 Internet message format.

Sender 302 sends an e-mail with an erroneous e-mail address for an intended e-mail recipient. A mail server is unable to deliver the e-mail to the intended e-mail recipient that is erroneously addressed. The mail server sends a delivery failure e-mail that contains an erroneous header with the erroneous e-mail address to e-mail client 300 for e-mail sender 302. Sender 302 receives a delivery failure e-mail that contains the erroneous header with the failed e-mail address through e-mail client 300 for the e-mail intended for recipient user 314. Sender 302 corrects the erroneous e-mail address for user 314 in a copy of the original e-mail to the correct e-mail address for user 314 and sends a corrected copy of the original e-mail to user 314 only. User 314 receives the corrected e-mail through e-mail client 308, but user 310 and user 312 still have only the original e-mail with the erroneous e-mail address for user 314. Therefore, if a "reply all" option is selected for e-mail client 304 or e-mail client 306 by user 310 or user 312 respectively, user 314 does not receive the reply and whoever sent the reply receives a delivery failure e-mail that contains the erroneous header with the failed e-mail address because both user 310 and user 312 still have the erroneous e-mail address for user 314. In this example, the erroneous header is erroneous because it contains the erroneous or failed e-mail address. The description of FIG. 5 below discusses an example of a header in more detail. The erroneous header problem creates not only a greater overhead for each e-mail recipient, but user 310 and user 312 still have to correct the e-mail address for user 314 even though sender 302 has already made this correction. Additionally, more roundtrip traffic has to occur before user 310 and user 312 are informed of the erroneous e-mail address for user 314 in the original e-mail. Each e-mail client, such as e-mail clients 300, 304, 306, and 308, contain a correcting e-mail editor, such as correction e-mail editors 338, 340, 342, and 344. Specifics regarding a correction e-mail editor are discussed below in reference to FIG. 6. The e-mail addresses for sender 302, user 310, user 312, and user 314 are oprah@ibm.com 346, bob@abc.net 348, sam@ibm.com 350, and johni@ln.abc.net 352, respectively.

Embodiments of the present invention send a correction note with corrected header information to the mailboxes of the recipients that successfully received the original e-mail, or received e-mail, including the e-mail sender. In some embodiments of the present invention this correction note is referred to as a phantom e-mail because the note contains only header information and no e-mail body. Another reason that the correction note may be referred to as a phantom note is because once the correction note arrives at an e-mail inbox, an e-mail mailbox, for a recipient, the correction note may instruct a user agent not to inform the e-mail client for the recipient about the presence of the correction note. A correcting user agent is a user agent, such as user agent 330 in FIG. 3, for correction notes specifically designed to both send and receive a correction note as well as to carry out instructions given by the correction note. An example of carrying out these instructions is when the correction note instructs the correcting user agent not to inform the e-mail client for the recipient about the presence of the correction note.

When an e-mail sender, such as sender 302 in FIG. 3, has entered an erroneous e-mail address when sending an e-mail, each e-mail recipient receives the received e-mail, and the e-mail sender receives a delivery failure e-mail that contains the erroneous header with the failed e-mail address.

Figure 4:
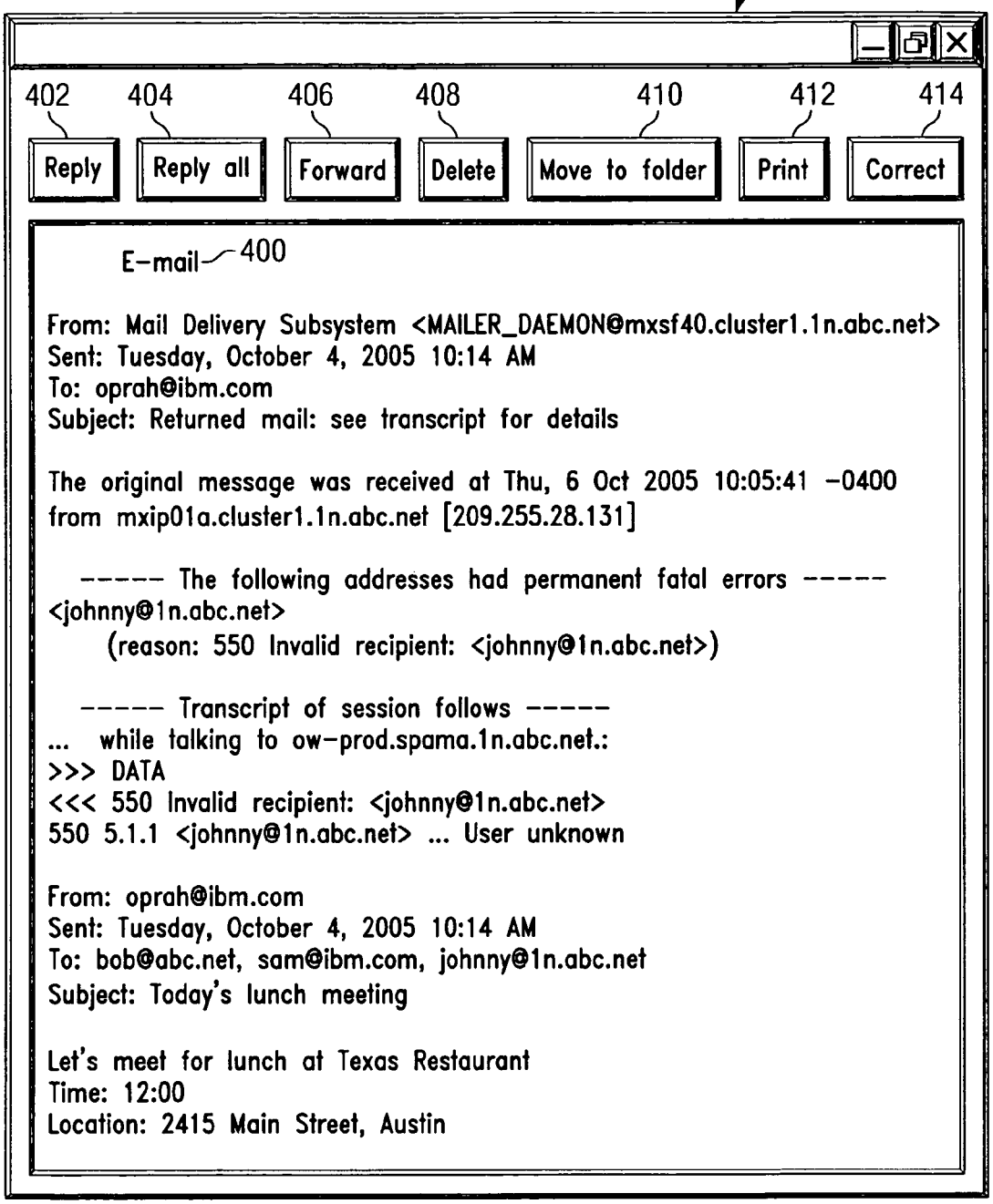
FIG. 4 is a block diagram illustrating a view of an e-mail in a mailbox for an e-mail client in accordance with an illustrative embodiment of the present invention.

FIG. 4 is a block diagram illustrating a view of an e-mail in a mailbox for an e-mail client, such as e-mail client 300 in FIG. 3 depicted in accordance with an illustrative embodiment of the present invention. When viewing an e-mail, an e-mail user has the option of using different options provided by the e-mail client for acting upon an e-mail, such as e-mail 400. These options may include reply 402, reply all 404, forward 406, delete 408, move to folder 410, print 412, and correct 414.

These options are offered only as an illustrative example and not to imply any limitation for embodiments of the present invention. The e-mail user may have other options depending upon the e-mail client. A receipt of an e-mail, such as e-mail 400, may be a receipt of an original e-mail sent by the e-mail sender or a receipt of a delivery failure e-mail that contains the erroneous header with the failed e-mail address. In this illustrative example, e-mail 400 is a delivery failure e-mail that contains the erroneous header with the failed e-mail address.

Selecting reply 402 enables an e-mail user, such as user 310 in FIG. 3, to reply to an e-mail sent by another e-mail user, such as sender 302 in FIG. 3. Selecting reply all 404 enables an e-mail user to reply to an e-mail sent by another e-mail user and also to reply to all other recipients of the e-mail, such as user 312 and user 314 in FIG. 3. Selecting forward 406 enables an e-mail user to forward an e-mail to recipients to be specified by the e-mail user. Selecting delete 408 enables an e-mail user to delete an e-mail. Selecting move to folder 410 enables an e-mail user to move an e-mail to a folder to be specified by the e-mail user. Selecting print 412 enables an e-mail user to print a hard copy of an e-mail.

A selection of a correct option, such as correct 414, is a selection that enables an e-mail user to correct any erroneous e-mail address in an e-mail in a mailbox, such as mailbox 416. A selection of a correct option enables an e-mail user to correct the erroneous header in the received e-mail in the mailboxes of the original recipients and send a copy of the original e-mail to the intended recipient that was erroneously addressed.

By selecting correct 414 to correct an e-mail, the e-mail client for the e-mail user may generate a correction note to correct the erroneous header in the e-mail in the mailboxes for the other recipients of the received e-mail. In contrast to the selection of reply 402, reply all 404, and forward 406 which use a standard e-mail editor to format an e-mail for composition, the selection of correct 414 uses a correction e-mail editor to format an e-mail for composition. A correction e-mail editor, such as correction e-mail editor 342 in FIG. 3, is an e-mail editor that gives an e-mail user the option of generating a correction note instead of simply correcting an e-mail. A correction e-mail editor formats a copy of a received e-mail when the e-mail editor enables an e-mail user to compose a correction of a received e-mail based upon the received e-mail.

FIG. 5 is a block diagram illustrating a full view of a header for an e-mail, such as e-mail 400 in FIG. 4, depicted in accordance with an illustrative embodiment of the present invention. Many e-mail clients, such as e-mail client 304 in FIG. 3, offer an option for an e-mail user, such as user 310 in FIG. 3, to view the full header of an e-mail, such as full header 500. In addition to the header that an e-mail client normally displays, such as e-mail sender 502, when the e-mail was sent 504, intended e-mail recipients 506, and subject 508, full header 500 also displays message identification 510. Erroneous header information 512 is also displayed as part of full header 500 and the header that an e-mail client normally displays.

FIG. 6 is a block diagram illustrating a view of an e-mail in a correction e-mail editor for an e-mail client, such as e-mail client 300 in FIG. 3 depicted in accordance with an illustrative embodiment of the present invention. An e-mail user, such as user 312 in FIG. 3, views the text for copy 602 of the received e-mail, such as the text for e-mail 400 in FIG. 4 and makes each addition 604 and each deletion 606 to erroneous header information 608. For example, e-mail user 312 deletes the fifth and sixth characters "ny" 606 from the third addressee, which was "johnny@ln.abc.net," the erroneous header information 608. In this example, each deletion is the deletion of "ny" for the fifth and sixth characters of the third addressee. Then e-mail user 312 adds the fifth character "1" 604 to the third addressee, which was "john@ln.abc.net," the erroneous header information 608. In this example, each addition is the addition of "i" for the fifth character of the third address. A correction of an erroneous header in an e-mail is each addition and each deletion to erroneous header made by an e-mail user.

If an e-mail user selects notify recipients 610 and selects a notify e-mail option, the correction e-mail editor instructs correction note 612 to notify the e-mail recipients about the existence of correction note 612 that is sent to the e-mail recipients. A notify option is a set of options presented by a correction e-mail editor for an e-mail user to select whether e-mail recipients are notified about a correction note and how a correction to the erroneous header and any annotation may appear in the received e-mail.

The correction e-mail editor stores each addition 604 and each deletion 606 in correction note 612 when the e-mail user selects send 614 or save draft 616 as an option presented by the correction e-mail editor of the e-mail client. A correction note is an electronic note that contains each correction which is each addition and each deletion to erroneous header. The correction note may contain instructions from a correction e-mail editor for a correcting user agent for the e-mail client of the recipient to find and correct the received e-mail for which the correction note is sent. An instruction, such as send 614, for the correction editor to send the correction note for the erroneous header in the e-mail is any instruction made by the e-mail user that indicates the correction note is complete and ready to be sent to the original e-mail recipients.

The options mentioned above are offered only as an illustrative example and not to imply any limitation for embodiments of the present invention. The e-mail user may have other options depending upon the standard editor for the e-mail client. When the e-mail user selects send 614, the correction e-mail editor sends correction note 612 to the addresses of the original recipients and sends a copy of the original e-mail to the correct e-mail address for the intended recipient that was erroneously addressed.

One alternative for an e-mail user is to select a correct option in an inbox, such as correct 414 in mailbox 416 in FIG. 4 to correct the erroneous header through corrections to the delivery failure e-mail that contains the erroneous header with the failed e-mail address. In another alternative, illustrative embodiments of the present invention offer an e-mail user a "pop-up" screen to correct an erroneous header in received electronic mail in remote mailboxes.

FIG. 7 is a block diagram illustrating a view of a pop-up screen for an e-mail client, such as e-mail client 300 in FIG. 3 depicted in accordance with an illustrative embodiment of the present invention. When an e-mail sender, such as sender 302 in FIG. 3, has entered an erroneous e-mail address when sending an e-mail, the inbox for the e-mail sender receives a delivery failure e-mail that contains the erroneous header with the failed e-mail address. In one illustrative embodiment of the present invention, the e-mail sender opens the delivery failure e-mail and selects a correct option to use a correction e-mail editor in order to correct the erroneous header. In another illustrative embodiment of the present invention, when the e-mail sender opens the delivery failure e-mail that contains the erroneous header with the failed e-mail address, pop-up screen 700 uses a correction e-mail editor to notify the e-mail sender of the available options.

Pop-up screen 700 lists failed e-mail address 702 for each intended recipient that was erroneously addressed. The e-mail sender views copy 704 of the received e-mail, such as e-mail 400 in FIG. 4. Then the e-mail sender makes each addition 706 and each deletion 708 to failed e-mail address 702. The combination of each addition and each deletion that an e-mail sender makes to an erroneous header for an e-mail is the correction for the e-mail. If the e-mail sender selects notify recipients 710, the e-mail sender may select a notify e-mail option. If the notify e-mail option is selected, the correction e-mail editor instructs correction note 712 to notify the e-mail recipients about the existence of correction note 712 that is sent to the e-mail recipients. The correction e-mail editor stores each addition 706 and each deletion 708 in correction note 712 when the e-mail sender selects send 714 or save draft 716. These options are listed only as an illustrative example and not to imply any limitation for embodiments of the present invention. The e-mail sender may have other options depending upon the standard editor for the e-mail client. When the e-mail sender selects send 714, the correction e-mail editor sends correction note 712 to the addresses of the original recipients and sends a copy of the original e-mail to the correct e-mail address for the intended recipient that was erroneously addressed. Pop-up screen 700 pops up in mailbox 718, which may be the same as mailbox 416 in FIG. 4. Each addition 706, each deletion 708, and correction note 712 may be the same as each addition 604, each deletion 606, and correction note 612 in FIG. 6.

When an e-mail user selects an option to notify recipients, such as notify recipients 610 in FIG. 6 and selects an indicate option, the correction e-mail editor may instruct the correction note to indicate to recipients of the correction note that the received e-mail is seamlessly corrected. An indication to recipients of the correction note that the received e-mail header is seamlessly corrected may be made by displaying the corrected text in a different font size, color, or format, such as bold or italics, from the original text. Alternatively, the corrected e-mail header may offer a link to the erroneous header. In one embodiment of the present invention, if a recipient of the correction note with corrected header information has already acted on the received e-mail, the recipient of the corrected header information is notified about the correction note. The recipient of the corrected header information has already acted on the received e-mail if the recipient of the corrected header information has already viewed the received e-mail or if the recipient of the corrected header information has already deleted the received e-mail. If the recipient of the corrected header information has not already acted on the received e-mail, the recipient of the corrected header information is not notified about the correction note. Annotations in the corrected header may indicate the identity of the e-mail user that corrected the erroneous header and when the e-mail user corrected the erroneous header.

Alternatively, once a correction note arrives at a recipient's mailbox, the correction note may instruct the correcting user agent for the recipient to notify the e-mail client for the recipient about the correction note. The correcting user agent for the recipient may notify the e-mail client for the recipient about the correction note by setting a flag in the mailbox of the recipient to indicate that the received e-mail is seamlessly corrected. All other features for the correction note remain the same as described above. Notification by the correction note containing corrected header information may inform the recipient of the corrected header information containing a correction to an e-mail address and prompt the recipient to update the address book of their e-mail client with the corrected e-mail address.

Figure 8:
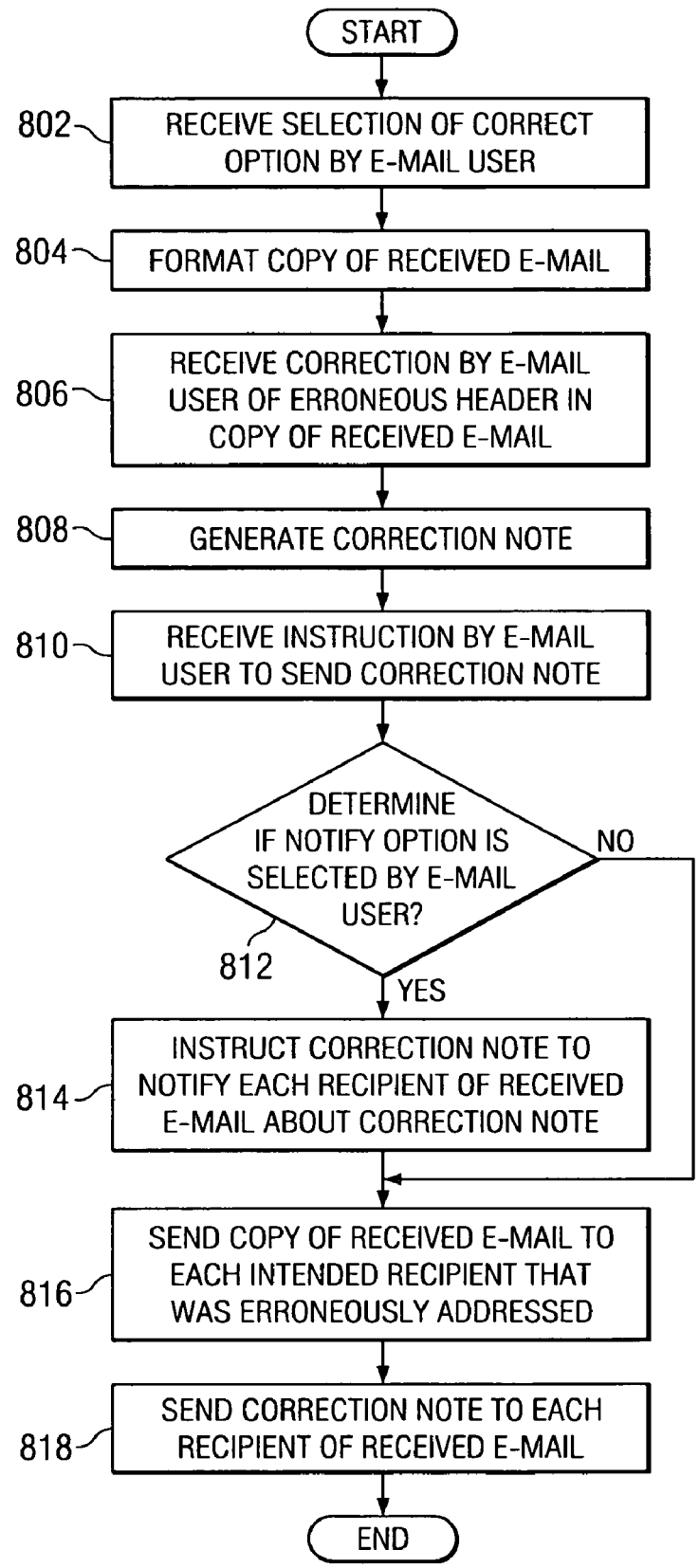
FIG. 8 is a flowchart of a process in a correction e-mail editor to correct a received e-mail having an erroneous header in accordance with an illustrative embodiment of the present invention.

FIG. 8 is a flowchart of a process in a correction e-mail editor to correct an erroneous header in a received e-mail, such as e-mail 400 in FIG. 4, boxes depicted in accordance with an illustrative embodiment of the present invention.

The correction e-mail editor receives a selection of the correct option by the e-mail user (step 802). Then the correction e-mail editor formats a copy of a received e-mail (step 804). A received e-mail is an e-mail received by an e-mail recipient that may be either a delivery failure e-mail that contains the erroneous header with a failed e-mail address or an e-mail sent by an e-mail sender. The correction editor may be offered in an inbox or a sent messages folder of the e-mail client for the e-mail user, or the correction editor may be offered in a pop-up screen for the e-mail user. The correction e-mail editor receives a correction by the e-mail user of an erroneous header in a copy of the received e-mail (step 806). Next, the correction e-mail editor generates a correction note (step 808).

The correction e-mail editor receives an instruction by the e-mail user to send the correction note (step 810). Then the correction e-mail editor determines if a notify option is selected by the e-mail user (step 812). If the notify option is selected by the e-mail user, the correction e-mail editor instructs the correction note to notify each recipient of the received e-mail, including the e-mail sender, about the correction note (step 814). Regardless of whether the notify option is selected by the e-mail recipient, the correction e-mail editor sends a copy of the received e-mail to each intended recipient that was erroneously addressed (step 816). Next, the correction e-mail editor sends the correction note to each recipient of a received e-mail, including the e-mail sender (step 818), with the process terminating thereafter.

Once a correction note, such as correction note 612 in FIG. 6 has arrived at a mail server for a recipient of the note, the correction note instructs a correcting user agent for the e-mail client of the recipient to find and correct the received e-mail for which the correction note was sent. In these illustrative examples the mail server may be implemented using a mail server, such as mail server 320, and the e-mail client may be implemented using an e-mail client, such as e-mail client 304 in FIG. 3. Also, the correcting user agent may be a user agent, such as user agent 326, and the recipient may be a recipient, such as user 310 in FIG. 3. The correcting user agent has all of the capabilities of a standard user agent but is also specifically designed to both send and receive a correction note as well as to carry out instructions given by the correction note. The correction note contains a message identification number of the received e-mail, such as message identification 510 of FIG. 5, for the correcting user agent to use in finding the received e-mail in the e-mail client.

The correcting user agent uses the message identification number of the received e-mail to find the received e-mail in the e-mail client by comparing the message identification number of the received e-mail to the message identification numbers of e-mail in the e-mail client. After the correcting user agent finds the received e-mail in the e-mail client, the correcting user agent uses the correction in the correction note to correct the erroneous header for the received e-mail. A correction to an erroneous header is the corrected portion of the header seamlessly integrating the correction made by the e-mail user. The correction note contains each addition and each deletion made by an e-mail user for the erroneous header. The correcting user agent may not find the received e-mail if the recipient of the correction note has already deleted the received e-mail. In this instance, no further processing is necessary, but an indication may be made to the recipient of the correction note that a correction note arrived for the deleted e-mail.

Figure 9A:
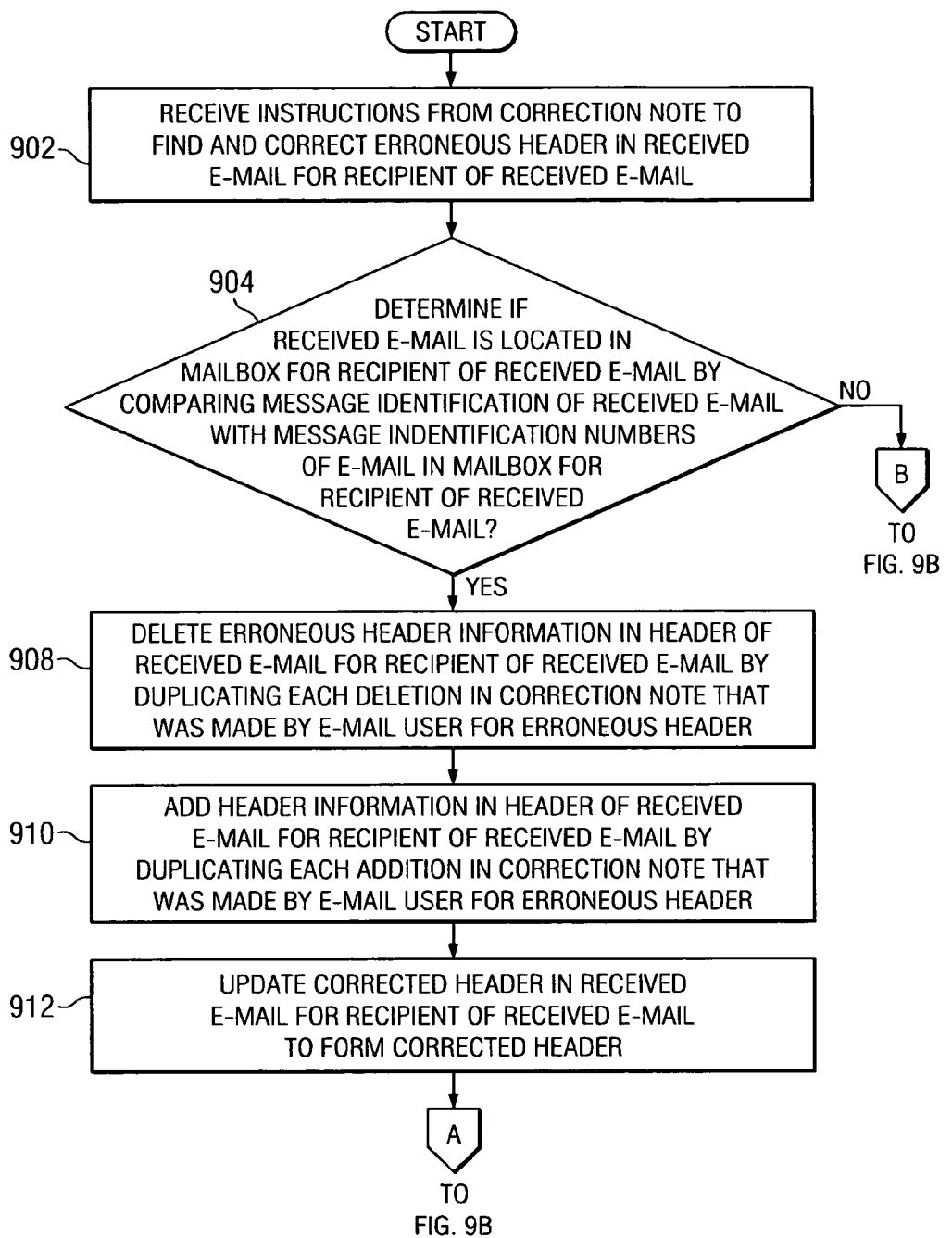
FIG. 9A-9B is a flowchart of a process for a correcting user agent to correct a received e-mail having an erroneous header in accordance with an illustrative embodiment of the present invention.
Figure 9B:
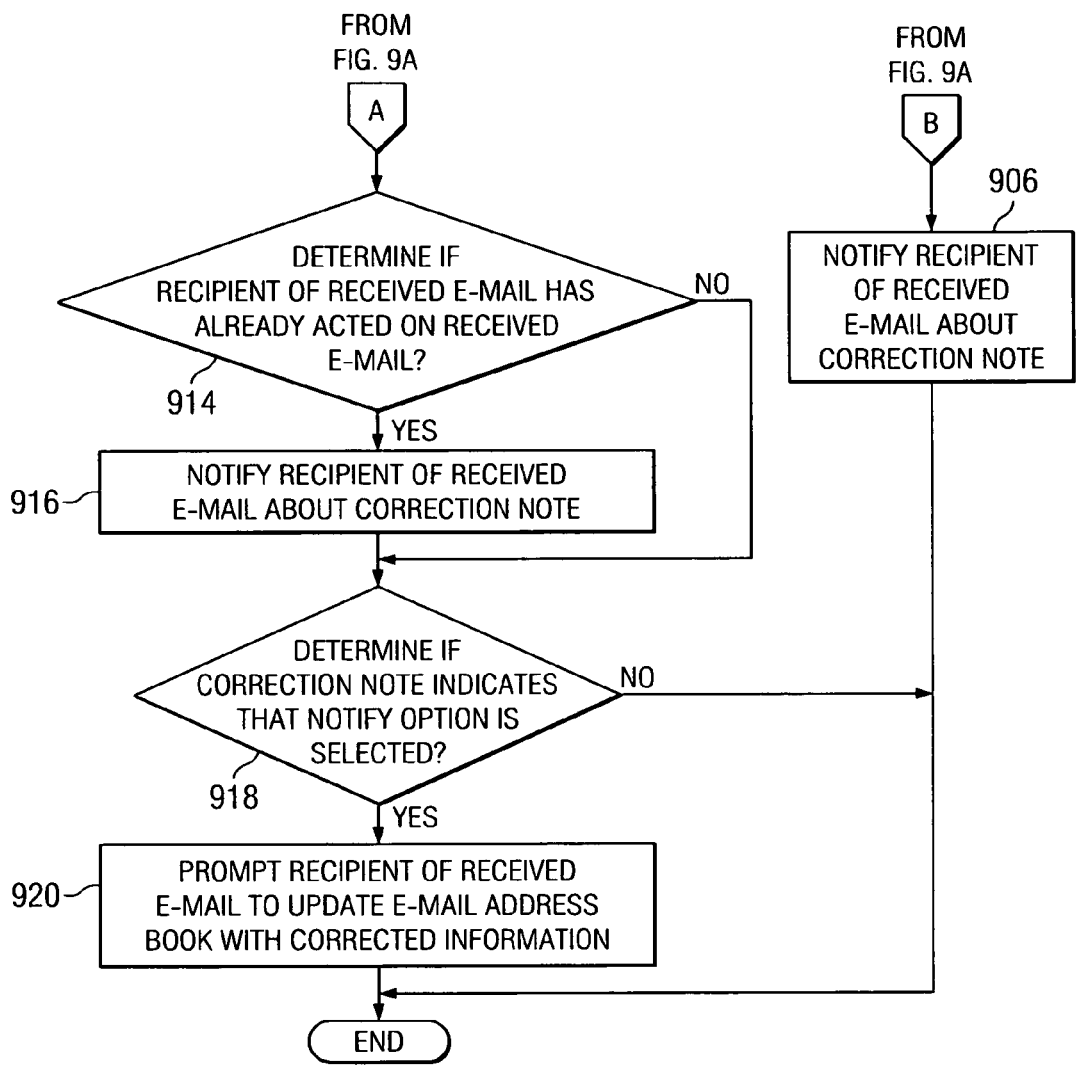

FIG. 9A-9B is a flowchart of a process for a correcting user agent to correct an erroneous header in a received e-mail depicted in accordance with an illustrative embodiment of the present invention. A correcting user agent receives instructions from a correction note to find and correct an erroneous header in the received e-mail for a recipient of the received e-mail (step 902). The correcting user agent determines if the received e-mail is located in a mailbox for the recipient of the received e-mail by comparing the message identification of the received e-mail with the message identification numbers of e-mail in the mailbox for the recipient of the received e-mail (step 904). In response to a determination that the received e-mail is not located in the mailbox for the recipient of the received e-mail, the correcting user agent notifies the recipient of the received e-mail about the correction note, and the process terminates (step 906). In response to a determination that the received e-mail is located in the mailbox for the recipient of the received e-mail, the correcting user agent deletes erroneous header information in the header of the received e-mail for the recipient of the received e-mail by duplicating each deletion in the correction note that was made by an e-mail user for the erroneous header (step 908). Next, the correcting user agent adds header information in the header of the received e-mail for the recipient of the received e-mail by duplicating each addition in the correction note that was made by the e-mail user for the erroneous header (step 910). Then the correcting user agent updates the corrected header information in the received e-mail for the recipient of the received e-mail to form a corrected header (step 912). The correcting user agent determines if the recipient of the received e-mail has already acted on the received e-mail (step 914). If the correcting user agent determines that the recipient of the received e-mail has already acted on the received e-mail, the correcting user agent notifies the recipient of the received e-mail about the corrected header (step 916). The correcting user agent determines if the correction note indicates that the notify option is selected (step 918). If the correcting user agent determines the correction note indicates that the notify option is selected, the correcting user agent prompts the recipient of the received e-mail to update an e-mail address book with the corrected header information (step 920), with the process terminating thereafter. A corrected header is a header that incorporates each correction made by the e-mail user for the erroneous header. In response to a determination that the received e-mail is not located in the mailbox for the recipient, the process terminates.

Each original recipient of the received e-mail and the e-mail sender now have the corrected header as part of only one e-mail in their respective mailboxes. The next time that a recipient opens the corrected e-mail in order to select the "reply all" option of the e-mail client, the reply is routed correctly to each intended recipient, including the intended recipient that was erroneously addressed in the received e-mail.

The option of correcting an erroneous header is not limited to the e-mail sender, as any e-mail user that is a recipient of the received e-mail may correct an erroneous header. Furthermore, the recipients of the e-mail may correct an erroneous header and send a copy of the received e-mail. For example, in the case of location/organization based e-mail addresses, there may be two or more e-mail users with the same name who are at different locations. An organization may have a James Smith in the Austin office of the organization and a different James Smith in the Dallas office of the organization. The e-mail sender may have intended an e-mail for the James Smith in Austin but accidentally addressed the e-mail to the James Smith in Dallas.

In response to a selection of the correct option by James Smith in Dallas, the correction e-mail editor formats a copy of a received e-mail. In response to a correction of an e-mail address to James Smith in Austin by James Smith in Dallas, the correction e-mail editor generates a correction note. In response to an instruction by James Smith in Dallas for the correction e-mail editor to send the correction note, the correction e-mail editor determines if a notify option is selected by James Smith in Dallas. If the notify option is selected by James Smith in Dallas, the correction e-mail editor instructs the correction note to notify each original recipient of the received e-mail, including the e-mail sender about the correction note. The correction e-mail editor sends a copy of the received e-mail to James Smith in Austin. The correction e-mail editor sends the correction note to each recipient of the received e-mail, including the e-mail sender. The correction note instructs a correcting user agent to find and correct an erroneous header in the received e-mail for each recipient of the received e-mail by using the message identifications and the correction of the erroneous header contained in the correction note.

In summary, when an e-mail sender has used an erroneous e-mail address when sending an e-mail and an e-mail user corrects the erroneous header, embodiments of the present invention correct the erroneous header in the received e-mail of the e-mail recipients of the received e-mail. These features result in a reduction of overhead in terms of data transmission in addition to the elimination of a tedious correction process.

The invention can take the form of an entirely hardware embodiment, an entirely software embodiment, or an embodiment containing both hardware and software elements. In an illustrative embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store, the program for use by or in connection with the instruction execution system, apparatus, or device.

Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the embodiments of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of correcting electronic mail address information that is erroneous in a received electronic mail, the computer implemented method comprising:
    receiving an option to correct the electronic mail address information that is erroneous in the received electronic mail;
    responsive to receiving the correction option, formatting a copy of the received electronic mail to form a formatted version of the received electronic mail;
    correcting the electronic mail address information in the formatted version of the received electronic mail; and
    responsive to correcting the electronic mail address information in the formatted version of the received electronic mail, generating a correction note that comprises the corrected electronic mail address information.

2. The computer implemented method of claim 1, further comprising:
    sending the correction note to remote electronic mailboxes having the received electronic mail with the erroneous electronic mail address information to enable the correction of the erroneous electronic mail address information.

3. The computer implemented method of claim 2, further comprising:
    sending the formatted version of the received electronic mail to each intended recipient that was erroneously addressed in the erroneous received electronic mail.

4. The computer implemented method of claim 1, wherein the correction note contains each correction that is an addition and deletion in the corrected electronic mail address information.

5. The computer implemented method of claim 4, wherein the correction note includes instructions that notify recipients of the correction note that the received electronic mail includes text that is already corrected.

6. The computer implemented method of claim 5, wherein the already corrected text displays a correction of the erroneous electronic mail address information in one of a different font size, color, and format from a font size, color, and format of the text in the received electronic mail.

7. The computer implemented method of claim 6, further comprising:
    setting a flag in an electronic mailbox to indicate the existence of the already corrected text for the corrected erroneous electronic mail address information.

8. The computer implemented method of claim 1, further comprising:
    determining whether a recipient of the correction note with corrected electronic mail address information has acted on the received electronic mail; and
    responsive to a determination that the recipient has acted on the received electronic mail, notifying the recipient of the correction note with the corrected electronic mail address information.

9. The computer implemented method of claim 1, wherein the correction note comprises a message identification number that enables a received electronic mail to be tracked in an electronic mailbox.

10. A data processing system for correcting electronic mail address information that is erroneous in a received electronic mail, comprising:
    a bus;
    a storage device connected to the bus, wherein the storage device contains computer usable code;
    a communication unit connected to the bus; and
    a processing unit connected to the bus, wherein the processing unit executes the computer usable code to perform actions comprising:
    receiving an option to correct the electronic mail address information that is erroneous in the received electronic mail;
    responsive to receiving the selected correction option, formatting a copy of the received electronic mail to form a formatted version of the received electronic mail;
    correcting the electronic mail address information in the formatted version of the received electronic mail; and
    responsive to correcting the electronic mail address information in the formatted version of the received electronic mail, generating a correction note that comprises the corrected electronic mail address information.

11. The data processing system of claim 10, further comprising an application programming interface that sends and receives the correction note to an electronic mailbox.

12. A computer program product that corrects electronic mail address information that is erroneous in a received electronic mail, the computer program product including a non-transitory computer usable storage medium with computer usable program code stored therein, the computer program product comprising:
   computer usable program code configured to receive an option to correct the electronic mail address information that is erroneous in the received electronic mail;
   responsive to receiving the selected correction option, computer usable program code configured to format a copy of the received electronic mail to form a formatted version of the received electronic mail;
   computer usable program code configured to correct the electronic mail address information in the formatted version of the received electronic mail; and
   responsive to correcting the electronic mail address information in the formatted version of the received electronic mail, computer usable program code configured to generate a correction note that comprises the corrected electronic mail address information.

13. The computer program product of claim 12, further comprising computer usable code configured to send the correction note to remote electronic mailboxes having the received electronic mail with the erroneous electronic mail address information to enable correction of the erroneous electronic mail address information.

14. The computer program product of claim 13, further comprising:
   computer usable program code configured to send the formatted version of the received electronic mail to each intended recipient that was erroneously addressed in the erroneous received electronic mail.

15. The computer program product of claim 12, wherein the correction note contains each correction that is an addition and deletion in the corrected electronic mail address information.

16. The computer program product of claim 15, wherein the correction note includes instructions that notify recipients of the correction note that the received electronic mail includes text that is already corrected.

17. The computer program product of claim 16, wherein the already corrected text displays a correction of the erroneous electronic mail address information in one of a different font size, color, and format from a font size, color, and format of the text in the received electronic mail.

18. The computer program product of claim 17, further comprising:
   computer usable program code configured to set a flag in an electronic mailbox to indicate an existence of the already corrected text for the corrected electronic mail address information.

19. The computer program product of claim 12, further comprising:
   computer usable program code configured to determine whether a recipient of the correction note with corrected electronic mail address information has acted on the received electronic mail; and
   responsive to a determination that the recipient has acted on the received electronic mail, computer usable program code configured to notify the recipient of the correction note with the corrected electronic mail address information.

20. The computer program product of claim 12, wherein the correction note comprises a message identification number that enables a received electronic mail to be tracked in an electronic mailbox.

* * * * *